(12) United States Patent
Koga et al.

(10) Patent No.: US 7,301,553 B2
(45) Date of Patent: Nov. 27, 2007

(54) LIGHT SOURCE CONTROL APPARATUS AND IMAGE FORMING APPARATUS USING THE SAME

(75) Inventors: Katsuhide Koga, Moriya (JP); Shigeo Hata, Toride (JP)

(73) Assignee: Canon Kabushiki Kaisha (JP)

( * ) Notice: Subject to any disclaimer, the term of this patent is extended or adjusted under 35 U.S.C. 154(b) by 299 days.

(21) Appl. No.: 11/219,206

(22) Filed: Sep. 2, 2005

(65) Prior Publication Data

US 2006/0050138 A1 Mar. 9, 2006

(30) Foreign Application Priority Data

Sep. 3, 2004 (JP) ............... 2004-257425

(51) Int. Cl.
*B41J 2/435* (2006.01)
*B41J 2/47* (2006.01)

(52) U.S. Cl. .................... 347/237; 347/247

(58) Field of Classification Search ........ 347/236–237, 347/240, 246–247, 251–254; 358/448
See application file for complete search history.

(56) References Cited

U.S. PATENT DOCUMENTS

| 4,794,413 A | * | 12/1988 | Yamazaki et al. .......... 347/247 |
| 4,837,787 A | | 6/1989 | Takesue et al. |
| 6,795,099 B2 | | 9/2004 | Koga et al. |
| 2005/0206964 A1 | * | 9/2005 | Hata et al. ................. 358/448 |

FOREIGN PATENT DOCUMENTS

| JP | 62-284747 A | | 12/1987 |
| JP | 03089269 A | * | 4/1991 |
| JP | 5-153397 A | | 6/1993 |
| JP | 5-188707 A | | 7/1993 |
| JP | 05188707 A | * | 7/1993 |
| JP | 2002-264386 A | | 9/2002 |
| JP | 2004-223716 A | | 8/2004 |

* cited by examiner

*Primary Examiner*—Hai Pham
(74) *Attorney, Agent, or Firm*—Rossi, Kimms & McDowell LLP

(57) ABSTRACT

A light source control apparatus for controlling the output of a light source for forming an electrostatic latent image on an image carrying member in an electrophotographic image forming apparatus, the light source control apparatus according to the present invention including a storing unit that stores first drive control data of the light source on two or more positions of the image carrying member, an interpolating that generates second drive control data on at least one interpolation position between the two or more positions based on the first drive control data, a digital-analog converting unit that converts the first and second drive control data to an analog signal, a low-pass filter that cuts a high-frequency component of the analog signal outputted from the digital-analog converting unit, and a driving unit that drives the light source in response to the analog signal from which the high-frequency component has been cut by the low-pass filter, wherein the low-pass filter has a cut-off frequency higher than a frequency for sampling on the two or more adjacent positions on the image carrying member and lower than a frequency for sampling on the two or more positions and the interpolation position.

4 Claims, 16 Drawing Sheets

LIGHT SOURCE CONTROL APPARATUS AND IMAGE FORMING APPARATUS USING THE SAME

FIELD OF THE INVENTION

The present invention relates to a light source control apparatus for controlling a light source for scanning an image carrying member to eliminate an unevenness of density of an image formed on the image carrying member in, for example, an electrophotographic image forming apparatus or the like, and relates to an image forming apparatus using the same.

BACKGROUND OF THE INVENTION

In the laser drive circuits of electrophotographic image forming apparatuses, a method of detecting the output of laser light in a light-detection zone of one scan and holding laser driving current of one scan is used to hold a fixed quantity of laser light of one scan.

Referring to FIG. 7, the following will describe a specific control method. In such image forming apparatuses, as shown in FIG. 7, a laser chip 43 constituted by one laser 43A and one photodiode (hereinafter, referred to as PD) sensor 43B is used. By using two current sources of a source 41 of bias current and a source 42 of pulsed current are used for the laser 43, the light-emitting characteristic of the laser 43A is improved. Further, in order to stabilize the light emission of the laser 43A, feedback is given to the source 41 of bias current by using an output signal from the PD (photodetector) sensor 43B and the amount of bias current is automatically controlled. That is, a logic element 40 outputs an ON signal to a switch 49 in response to a signal of lighting at full power from a sequence controller 47, so that the laser 43 is fed with the sum of the current from the source 41 of bias current and the source 42 of pulsed current. The output signal from the PD sensor 43B at that time is inputted to an I/V converter 44, amplified by an amplifier 45, and inputted as a signal VPD to an APC circuit 46. Further, the output signal is supplied as a control signal VAPC from the APC circuit 46 to the source 41 of bias current. This circuit system is called an APC (abbreviation of Auto Power Control) circuit system which is currently a typical circuit system for driving a laser. The laser has a temperature characteristic. The higher temperature is, the larger amount of current for obtaining a fixed quantity of light increases. Since the laser generates heat by itself, a fixed quantity of light cannot be obtained only by supplying a constant current. In a solution to this problem, by using the APC circuit system for each scan, the amount of current applied to the laser diode 43A is controlled to a fixed amount such that each scan has a constant laser light-emitting characteristic. Generally in electrophotography, laser light is detected by a sensor disposed on a fixed position to generate a synchronizing signal of main scan, and a BD (beam detect) signal is generated. Thus, for example, a full power output period of laser is set from a position immediately before the sensor for BD is radiated with laser light to the irradiation of the laser light on a photoconductive drum; meanwhile, APC control is performed such that the source 41 of bias current is controlled by the APC circuit 46 to have a fixed quantity of output light for each scan. A bias current determined in the full power output period is kept during one scan.

The laser light controlled with a fixed light quantity is blinked by turning on/off the switch 49 according to data modulated by a pixel modulating unit 48; meanwhile, an electrostatic drum is scanned and an image is formed thereon.

Further, in the case of a multilaser such as a 2-beam laser, only one PD is provided for a plurality of lasers in the structures of the lasers. Thus, time-division APC is performed in which a laser on one side is turned on during one scan and the light quantity of the laser is monitored by the PD to perform APC control. After the laser is turned off, the other laser is turned on and the light quantity of the laser is monitored by the PD to perform APC control.

Even when the quantity of laser light is uniformly controlled thus by APC control, some characteristics of a used photoconductor may cause a considerably unevenness of electric potential ($\Delta$E>5V) in the main scanning direction as shown in FIG. 8. The unevenness of electric potential is caused by difficulty in the manufacturing of a thin film. Regarding a thin film formed on a surface of a photoconductive drum, it is extremely difficult to have an even thickness in the main scanning direction as compared with the circumferential direction. By using a photoconductor having a thin film with an uneven thickness in the main scanning direction, an exposed part has an unevenness of electric potential on some positions in the main scanning direction, resulting in a longitudinal unevenness of density along the sub-scanning direction in an image. Therefore, image quality seriously decreases.

In the case of an image forming apparatus using a multi-beam laser such as a 2-beam laser, as shown in FIG. 10, illumination distributions obtained by lasers on a drum are different from each other due to the far field patterns of the lasers, a distance between two beams, a state of attachment to an optical unit, and so on. Hence, an unevenness of density appears in the front and rear sides of an image and seriously degrades image quality.

In order to solve these problems, the following technique is devised: light quantity data obtained on two or more points of one scanning line with a laser is measured and stored, the light quantity data on each point is subjected to D/A conversion, and a laser driving current is controlled in response to a signal obtained by filtering an analog signal, which has been obtained after D/A conversion, through a low-pass filter (Japanese Patent Laid-Open No. 2004-223716).

In this method, when the number of measured points is reduced to have a smaller storage capacity, a somewhat smooth light quantity distribution shown in FIGS. 8 and 10 can be corrected by reducing the cut-off frequency of the low-pass filter. However, when a light quantity distribution with a rapid change shown in FIGS. 9 and 11 is corrected, the low-pass filter becomes poor in tracking and thus the light quantity distribution is insufficiently corrected. When the cut-off frequency of the low-pass filter is raised by increasing the number of measured points, the low-pass filter is improved in tracking, and thus it is possible to correct the light quality distribution with the rapid change shown in FIGS. 9 and 11. However, a storage capacity for storing measurement data is increased, resulting in a problem of cost.

SUMMARY OF THE INVENTION

An object of the present invention is to provide a light source control apparatus and an image forming apparatus using the same whereby a surface electric potential can be corrected according to the characteristic of a photoconductor even when the photoconductor has an unevenness of electric potential with a rapid change in the main scanning direction, thereby providing a high-quality image.

Another object of the present invention is to provide a light source control apparatus and an image forming apparatus using the same whereby an illumination distribution can be corrected according to the characteristic of a laser optical system even when the optical system has an illumination distribution with a rapid change, thereby providing a high-quality image.

In order to attain the objects, the present invention is configured as follows:

A light source control apparatus for controlling a light source for forming an electrostatic latent image on an image carrying member in an electrophotographic image forming apparatus, the light source control apparatus, comprising a storing unit that stores first drive control data of the light source on two or more positions of the image carrying member, an interpolating unit that generates second drive control data on at least one interpolation position between the two or more positions based on the first drive control data, a digital-analog converting unit that converts the first and second drive control data to an analog signal, a low-pass filter that cuts a high-frequency component of the analog signal outputted from the digital-analog converting unit, and a driving unit that drives the light source in response to the analog signal from which the high-frequency component has been cut by the low-pass filter, wherein the low-pass filter has a cut-off frequency higher than a frequency for sampling on the two or more adjacent positions on the image carrying member and lower than a frequency for sampling on the two or more positions and the interpolation position.

With this configuration, it is possible to improve the tracking of the low-pass filter without increasing the number of samples for storing sampled data or control data based on sample data. Therefore, even in the case of a rapid change in an unevenness of electric potential in the main scanning direction of a photoconductor, it is possible to correct the electric potential according to the change, thereby providing a light source control apparatus and an image forming apparatus which can dramatically improve image quality even when a thin film or the like of a used photoconductor has an uneven thickness.

Further, even in the case of a laser optical system having an illumination distribution with a rapid change, it is possible to correct the illumination distribution according to the characteristic, thereby providing a light source control apparatus and an image forming apparatus which can provide a high-quality image without improvement for smoothing a laser characteristic.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

First Embodiment

Figure 1:
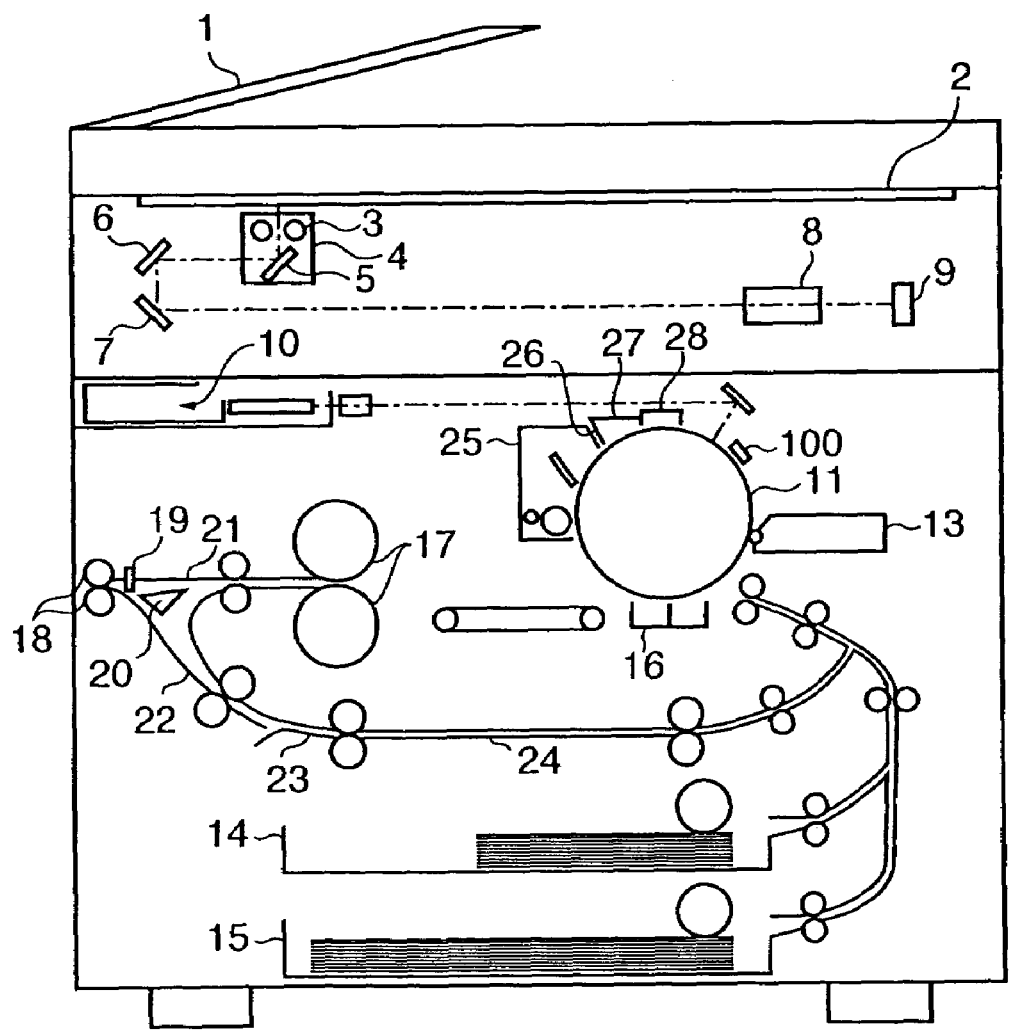
FIG. 1 is a diagram showing the configuration of a digital printer.

The present invention will be described below in accordance with embodiments shown in the accompanying drawings. FIG. 1 is a sectional view showing the overall configuration of an electrophotographic copying machine illustrated as a positional embodiment of the present invention. Documents loaded on a document feeder 1 are carried one by one to a document glass 2. When a document is carried to the document glass 2, the lamp of a scanner 3 is lit and a scanner unit 4 moves to illuminate the document. Light reflected from the document passes through a lens 8 via mirrors 5, 6, and 7 and then is inputted to an image sensor unit 9. An image signal converted to an electric signal in the image sensor unit 9 is directly or temporarily converted to a digital signal, stored in image memory (not shown), and then read from the image memory. Thereafter, the signal is inputted to an exposure controller 10. A latent image is developed by a developer unit 13. The latent image has been formed on a photoconductor 11 by radiated light such as laser light generated by the exposure controller 10. A recording medium is carried from a recording medium loading unit 14 or 15 in synchronization with the latent image. The developed toner image is transferred onto the recording medium in a transfer unit 16. The transferred toner image is fixed on the recording medium in a fixing unit 17 and then ejected outside the copying machine from an ejecting unit 18. After the transfer, a surface of the photoconductor 11 is cleaned with a cleaner 25, and an auxiliary electrifier 26 removes static from the surface of the photoconductor 11 having been cleaned with the cleaner 25, so that preferred electrification is obtained in a primary electrifier 28. After that, residual charge on the photoconductor 11 is eliminated by a front exposure lamp 27 and the surface of the photoconductor 11 is electrified by the primary electrifier 28. A plurality of images are formed by repeating these steps.

Further, the copying machine comprises electric potential sensors 100 for measuring an electric potential on a predetermine position on the photoconductor 11 in the main scanning direction. With the electric potential sensors 100, an electric potential on the photoconductor 11 can be measured. For example, about six electric potential sensors 100 are provided at regular intervals along the main scanning direction.

Figure 2:
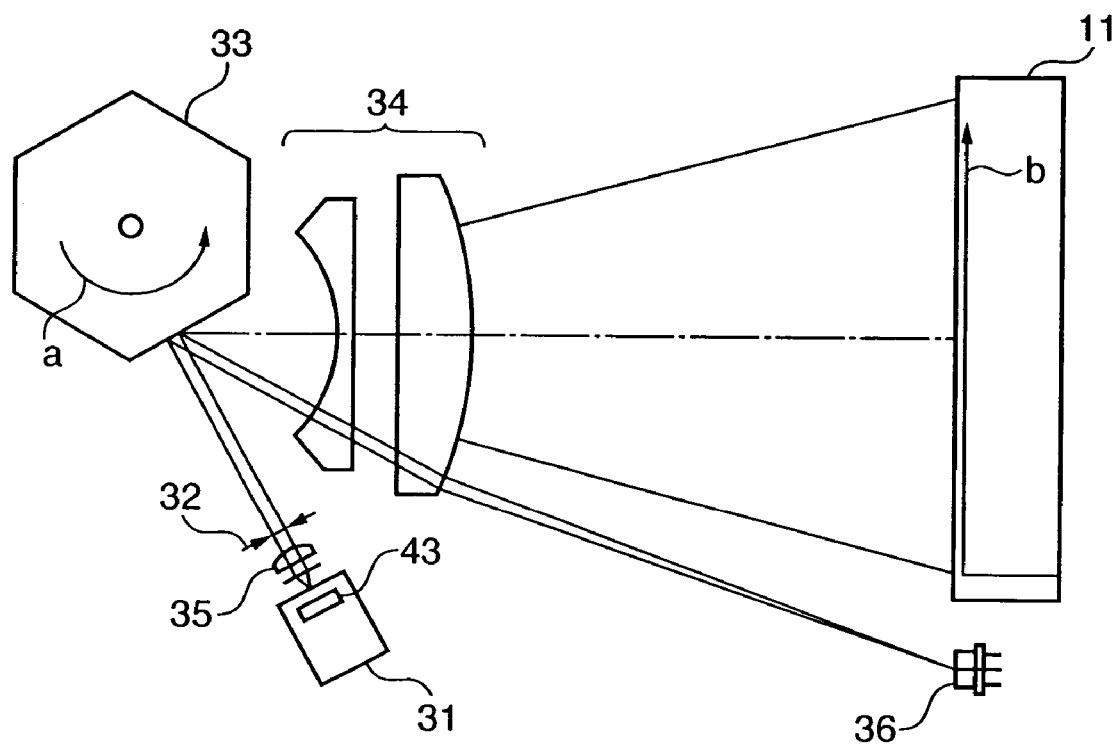
FIG. 2 is a diagram showing the configuration of an exposure controller of the digital printer.

FIG. 2 shows the configuration of the exposure controller 10. In FIG. 2, a laser drive 31 controls the driving of a semiconductor laser 43 to obtain laser oscillation. A PD sensor for detecting a part of laser light is provided in the semiconductor laser 43 (see FIG. 3). The APC control of a laser diode is performed using a detection signal of the PD sensor. A laser beam emitted from the laser 43 is transformed almost into parallel rays by a collimator lens 35 and a diaphragm 32 and is incident on a rotating polygon mirror 33 with a predetermined beam diameter. The rotating polygon mirror 33 rotates at a constant angular velocity in the direction of an arrow a. In response to the rotation, the incident light beam is reflected as a deflected beam which continuously changes its angle. The deflected beam is gathered through an f-θ lens 34. At the same time, since the f-θ lens makes a correction ensuring linearity of scanning in terms of time, the light beam forms an image on the photoconductor 11, which serves as an image carrying member, and is scanned with a constant velocity in the direction of an arrow b. A beam detect (hereinafter, referred to as BD) sensor 36 detects light reflected from the rotating polygon mirror 33. The detection signal of the BD sensor 36 is used as a synchronizing signal for synchronizing the rotation of the rotating polygon mirror 33 and data writing (input) to a modulating unit 48 (as shown in FIG. 3).

Figure 3:
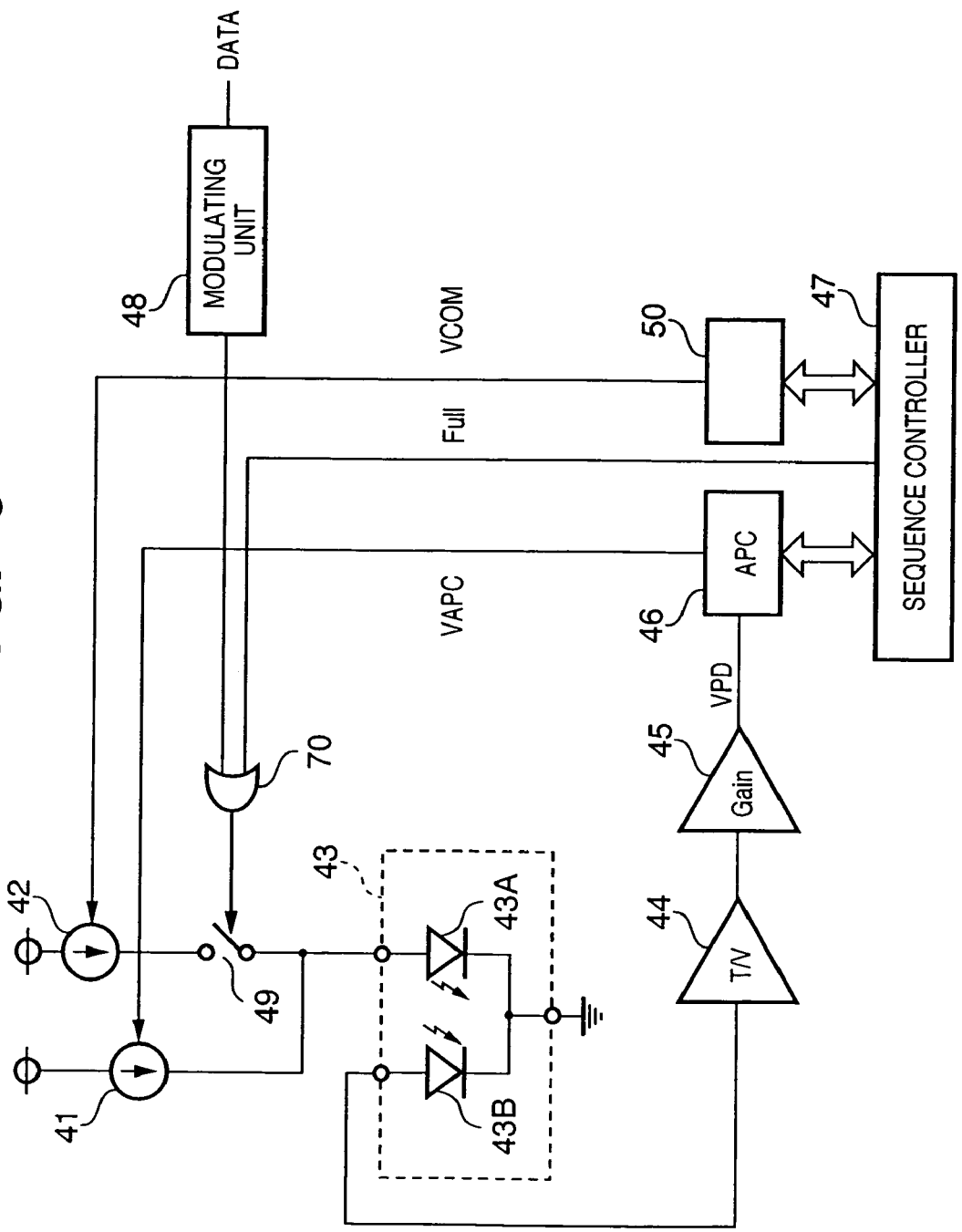
FIG. 3 is a diagram showing the configuration of a laser drive circuit.
Figure 5A:
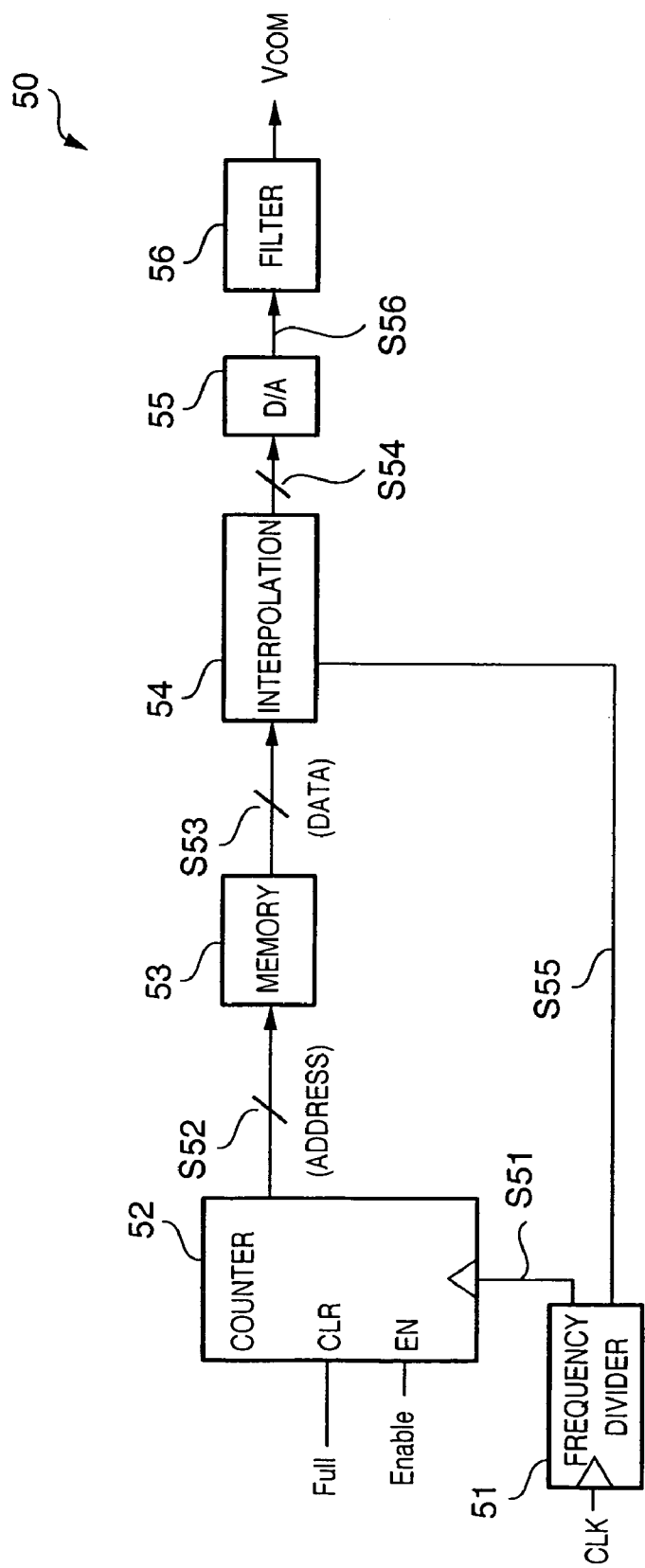
FIG. 5A is a diagram showing the configuration of a pulsed current amount control unit of the laser drive circuit.
Figure 5B:
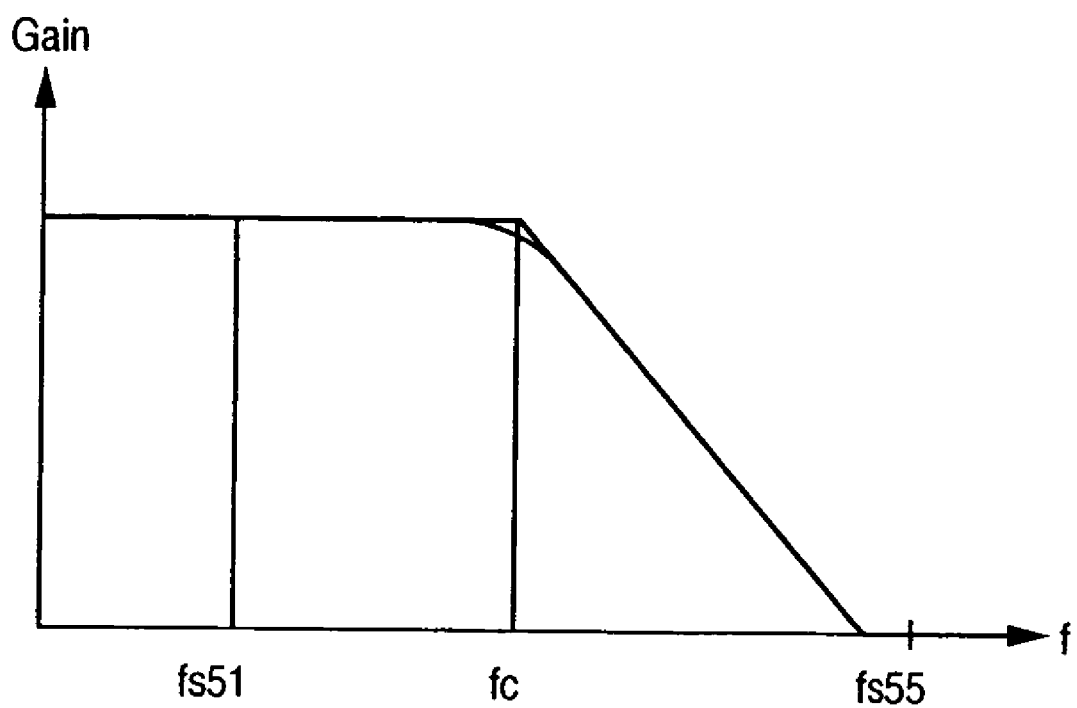
FIG. 5B is a diagram showing the frequency characteristic of a filter.
Figure 6:
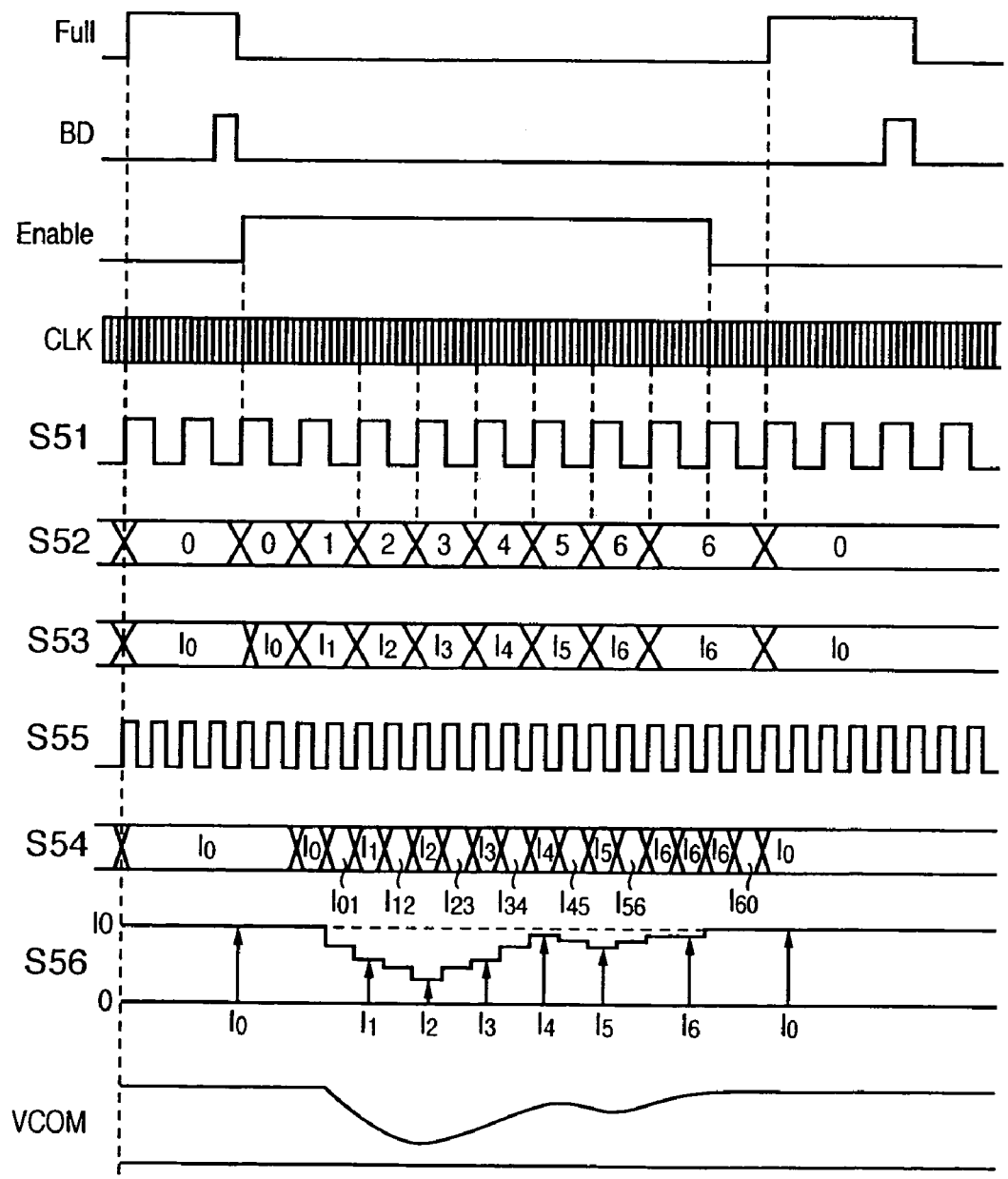
FIG. 6 is a diagram showing the timing of the pulsed current amount control unit of the laser drive circuit.
Figure 7:
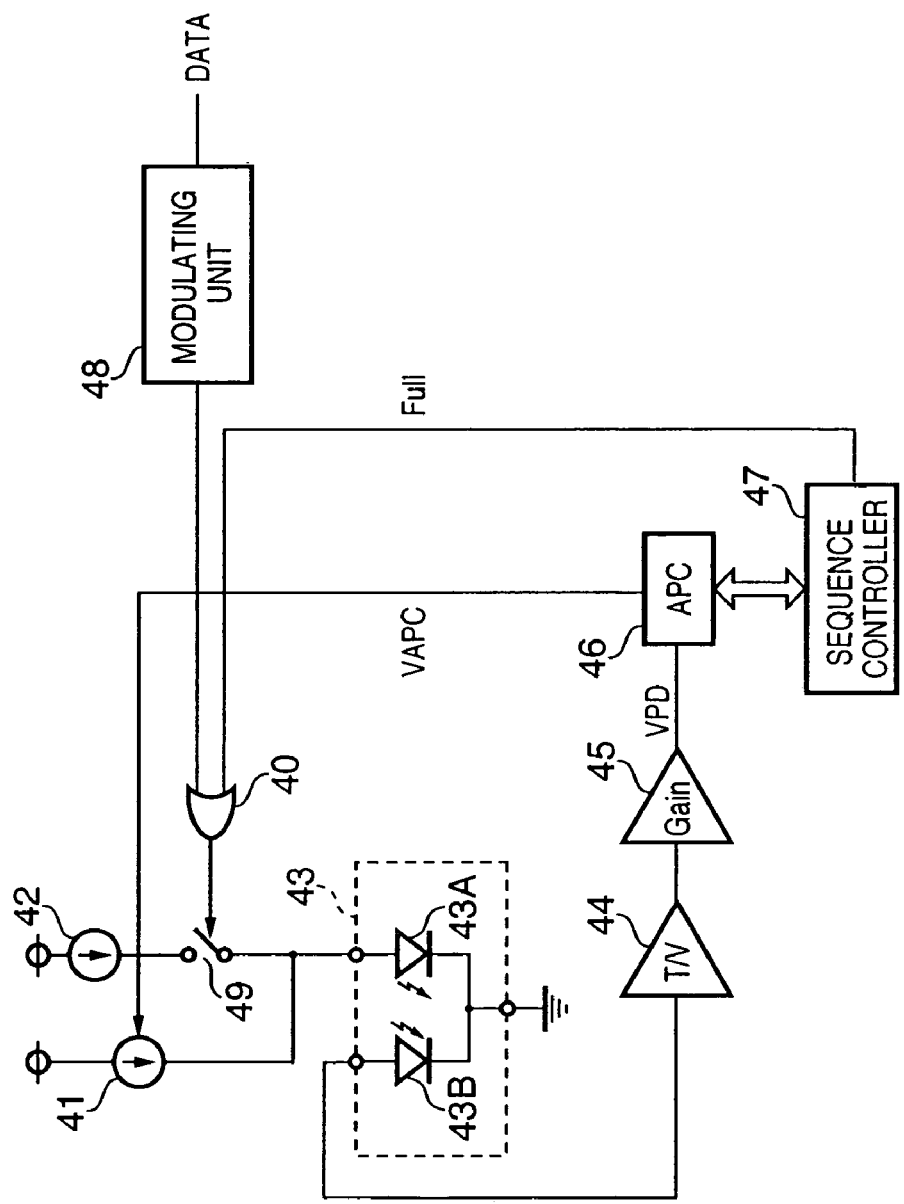
FIG. 7 is a diagram showing an example of the laser drive circuit of a conventional digital printer.

Referring to FIGS. 3, 5, and 6, the operations of a laser control circuit of the present embodiment will be specifically discussed below. FIG. 3 is a block diagram showing the configuration of the present embodiment. In FIG. 3, the laser chip 43 is a semiconductor laser and is constituted by a laser diode 43A and a PD sensor 43B. A current source 41 is a bias current source of the laser 43A and a current source 42 is a pulsed current source of the laser 43A. DATA serving as an image signal is subjected to pixel modulation in the modulating unit 48. A switch 49 is turned on or off by a signal obtained by ORing, in a logic element 40, the modulated image signal and a signal FULL of lighting at full power for detecting BD. The signal FULL has been sent from a sequence controller 47. When the switch 49 is turned on, the laser 43A emits light with the sum of the current of the source 41 of bias current and the current of the source 42 of pulsed current. The source 41 of bias current is controlled for each scan and the source 42 of pulsed current is variably controlled two or more times for each scan. When the switch 49 is turned off, the laser 43A emits light only with the current of the source 41 of bias current.

Figure 4:
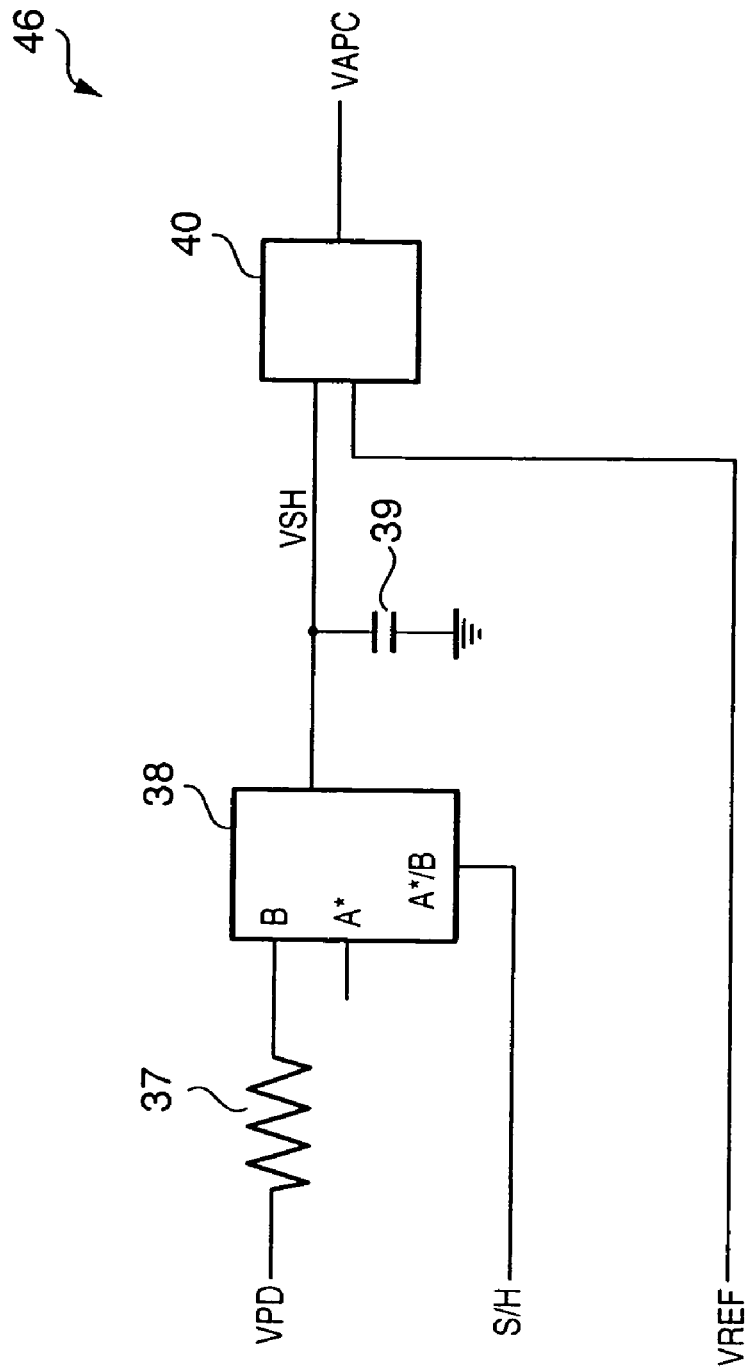
FIG. 4 is a diagram showing an example of an APC circuit.

The output signal of the PD sensor 43B having monitored a light quantity of lighting at full power for detecting BD (that is, when the signal FULL of lighting at full power is active) is converted to a voltage signal in a current/voltage (I/V) converter 44. Thereafter, the voltage signal is amplified in an amplifier 45 and inputted as a signal VPD to an APC circuit 46. The APC circuit 46 has, e.g., a circuit shown in FIG. 4. An amplified PD sensor output VPD is sampled by using an analog switch 38 with a sample/hold signal S/H from the sequence controller 47, and a voltage value VSH is held during one scan with a time constant determined by a resistor 37 and a capacitor 39. Then, the voltage value VSH and a predetermined reference voltage VREF are compared with each other by a comparator 70 and a difference signal VAPC is outputted. The current of the source 41 of bias current is controlled according to the signal VAPC. In other words, the current of the source 41 of bias current is controlled for each scan so as to have a target bias light-emitting value set as the reference voltage VREF, so that APC control is performed such that the quantity of bias light of the semiconductor laser 43A is a desired light quantity.

<The Control of the Pulsed Current Source>

In the copying machine of the present embodiment, a signal Vcom for controlling the amount of pulsed current during one scan in a pulsed current amount control unit 50 is generated in parallel with the APC control to control the source 42 of pulsed current. Referring to FIGS. 5 and 6, the circuit of the pulsed current amount control unit 50 will be discussed below.

Figure 8:
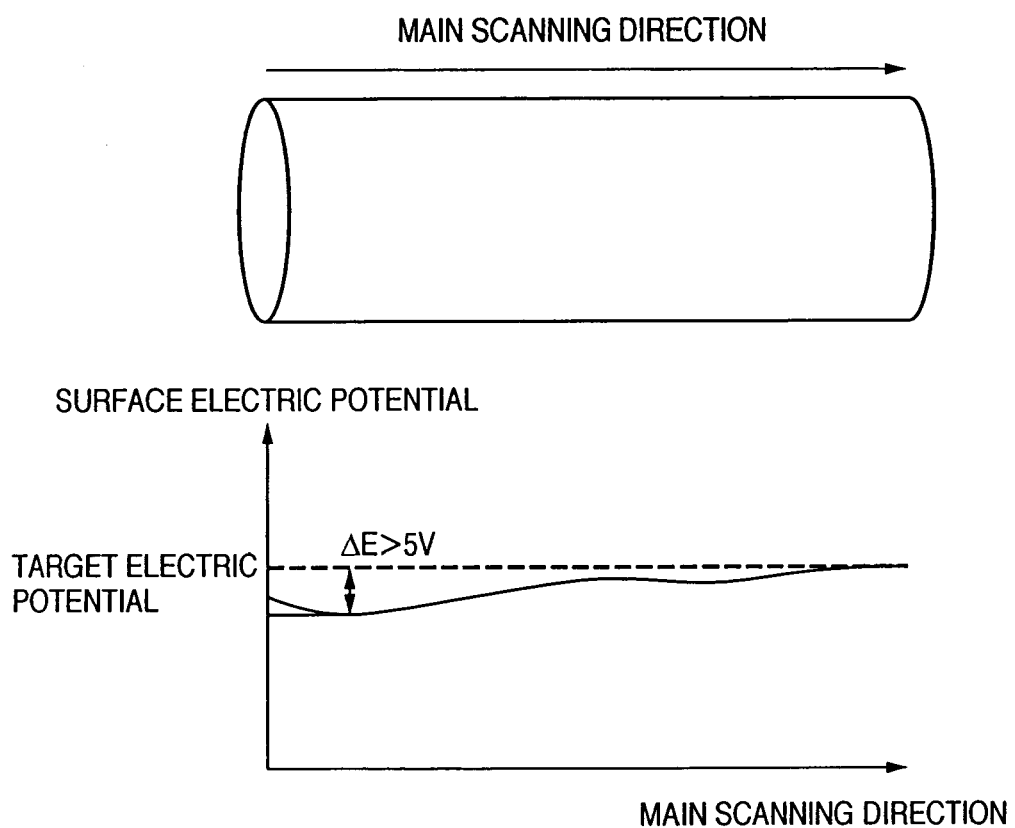
FIG. 8 is a diagram showing an unevenness of electric potential on a surface of a drum.
Figure 9:
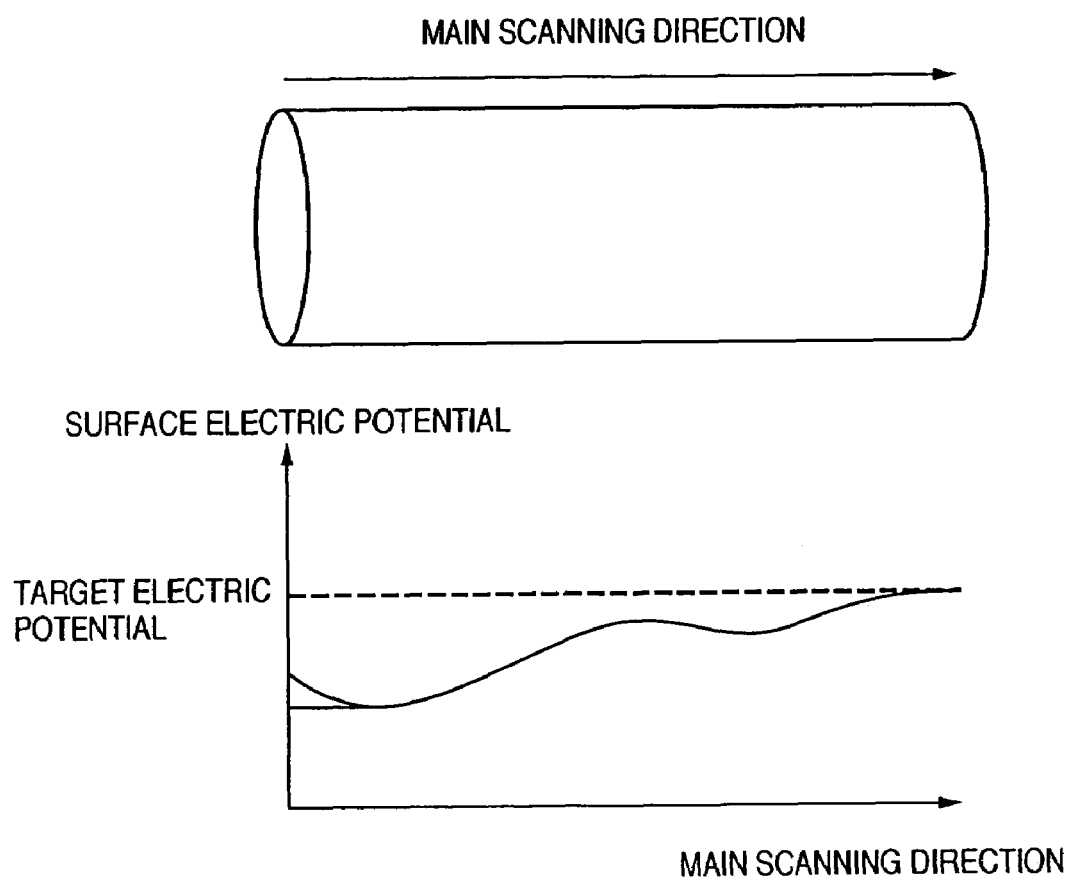
FIG. 9 is a diagram showing an unevenness of electric potential with a rapid change on the surface of the drum.
Figure 10:
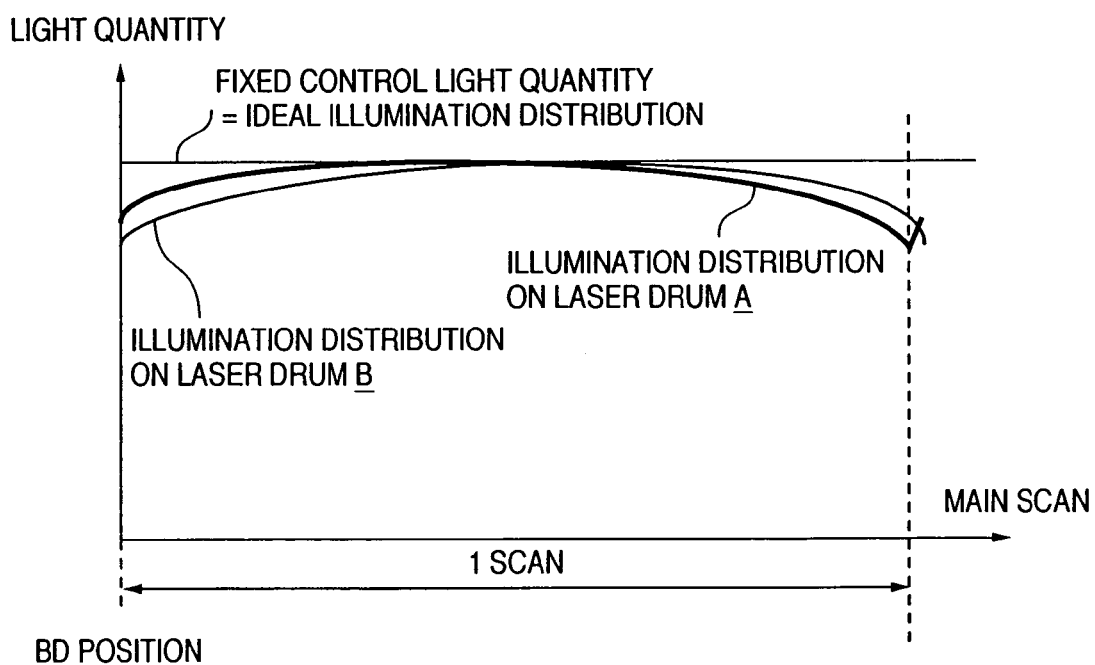
FIG. 10 is a diagram showing illumination distributions on the drum of a 2-beam laser.

In FIG. 5A, a clock S51 obtained by dividing a pixel clock CLK by means of a frequency divider 51 such as a counter is inputted to an up counter 52 with asynchronous clear and enable. The counter 52 outputs 0 while the signal FULL of lighting at full power for detecting BD is inputted. After the signal FULL of lighting at full power is canceled, the frequency divided clock S51 is counted while a light quantity variable region signal Enable is inputted from the sequence controller 47. Then, a count value (or some digits of the value) is outputted as an address to memory 53 such as RAM. Data on a ratio of light quantity relative to a main scanning position is stored beforehand in the memory 53 from a CPU (not shown). The stored data is read according to a scanning position. Correction data to be stored will be discussed below with an example of a drum having a characteristic shown in FIG. 8. The drum shown in FIG. 8 is characterized by a low electric potential on a scanning start position, even when the drum is radiated with a constant light quantity such that a surface of the drum has a target electric potential. The electric potential on the surface of the drum decreases when a light quantity is too large. In order to increase the surface electric potential, the amount of laser driving current is reduced to have a lower light quantity. The surface electric potential reaches the target electric potential on the scanning end position, and thus the amount of laser driving current can remain at a light quantity corresponding to the signal VAPC obtained by APC control.

(Generation of Control Data)

Prior to image formation, one line (or the number of lines sufficiently enabling detection of an electric potential) is scanned in lighting at full power under APC control, and an electric potential is detected by the electric potential sensor 100. A difference between the detected electric potential and the target electric potential (referred to as correction data or control data) is calculated at two or more points of scanning positions (that is, positions where the electric potential sensors 100 are placed, also referred to as sample points). Then, relative to an amount of laser driving current to be the target electric potential, a ratio to a reference current value is stored as data in the memory. At this point, the location of the memory for storing the data is determined by the positions of the sample points. In other words, the positions of the sample points are indicated by counting, e.g., pixel clocks or the like with a counter, and the values of the positions are inputted as addresses to the memory. Then, control data corresponding to the sample points is outputted from the memory.

Figure 15:
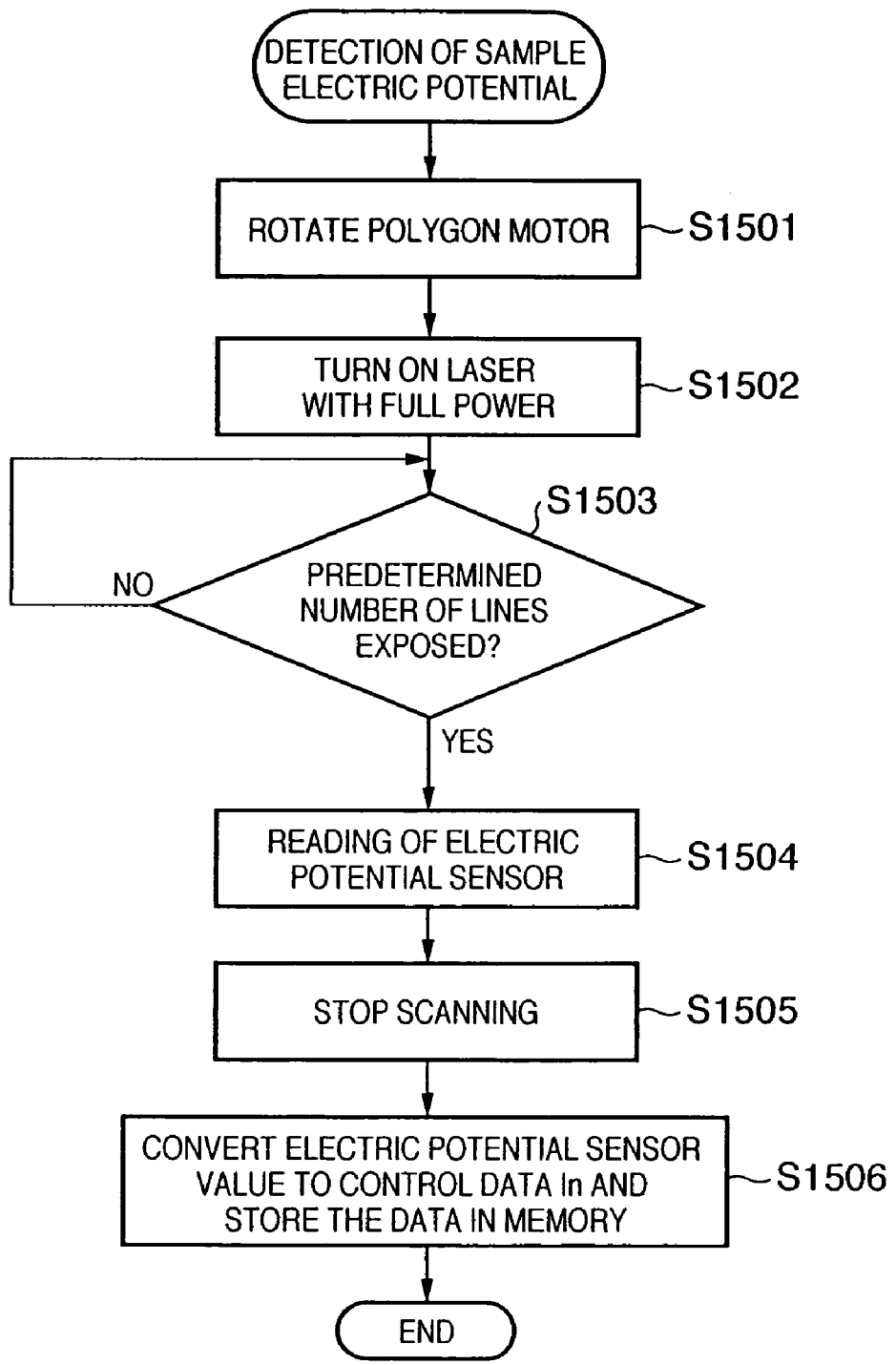
FIG. 15 is a diagram showing an example of sampling steps.

FIG. 15 is a flowchart showing steps of measuring an electric potential on the sample point beforehand. First, a motor for rotating the polygon mirror is rotated (S1501) and the laser is lit with full power when a constant number of revolutions is obtained (S1502). At this point, APC control is performed. Then, the photoconductor is exposed over a predetermined number of lines (S1503) and an electric potential on a sample point is measured and read by the electric potential sensor 100 (S1504). Laser scanning is stopped after that (S1505). Finally, a value read by the electric potential sensor is converted to control data In and stored in a corresponding address in the memory 53. For example, when sample point 0 has an electric potential I0, the value is stored in address 0. In the present embodiment, the value of control data is proportionate to a measured electric potential. The source 42 of pulsed current outputs a large current for a large control data value and outputs a small current for a small control data value. A specific correspondence between the current value and the control data value can be determined accurately by experiments. Each photoconductor has a different film thickness distribution and thus it is desirable to perform the steps of FIG. 15 every time the photoconductors are exchanged. In order to respond to chronological changes, the steps may be performed every fixed period instead of every exchange of photoconductors.

(Pulsed Current Variable Control Unit)

During image formation, in the pulsed current amount control unit 50, control data on a sample point on the main scanning position and an adjacent sample point is read from the memory 53 in synchronization with scanning. Then, the read control data on the adjacent sample point is inputted to an interpolation circuit 54. A clock S55 is inputted to the interpolation circuit 54. The clock S55 has a higher frequency than the clock S51 outputted by the frequency divider 51. In the present embodiment, the clock S55 has a frequency twice that of the clock S51. Since the clock S55 is used for identifying the position of a sample point, the maximum period of the clock S55 is equal to about a time period required for scanning between adjacent sample points with a laser beam. For example, when six sample points are arranged at regular spacings, the maximum period of the clock S51 is preferable when the maximum period is equal to one sixth of a time period required for one scan, and a shorter period is also preferable. Then, when the signal FULL of lighting at full power is cancelled by the counter 52 (that is, when scanning is started), the clock S51 is counted and control data is outputted from the memory 53 while the count value is used as an address corresponding to the sample point.

The interpolation circuit 54 performs the operation below based on control data In and In+1 on two consecutive inputted sample points to calculate Inn+1. That is, in addition to the control data In and In+1 on sample points n and n+1, an intermediated point is used as an interpolation point and control data Inn+1 on the intermediate position is generated. Then, each of the data is outputted to a D/A converter 55 (data S54).

$$I_{nn+1}=(I_{n+1}-I_n)/2+I_n=(I_{n+1}+I_n)/2$$

The D/A converter 55 converts the sequentially inputted digital data In, Inn+1, and In+1 to an analog value S56 and outputs the value to a filter 56. As shown in FIG. 5B, the filter 56 is a low-pass filter having a cut-off frequency fc which is higher than a frequency fs51 of the clock S51 and lower than a frequency fs55 of the clock S55. The filter 56 generates the smooth analog output signal Vcom and outputs the signal to the source 42 of pulsed current. The source 42 of pulsed current drives the laser 43A with a current value corresponding to the analog signal Vcom. At this point, a value obtained by D/A conversion on data I0 on address 0 in the memory 53 is a reference pulsed current value. In a full lighting zone for APC control, lighting is performed at full power with the sum of the pulsed current value and the bias current value. A target current value for one scan is set by the APC circuit. Subsequently, when a scanning position comes to a light quantity variable region (actual scanning line), the light quantity variable region is radiated in response to a pixel modulation signal with the sum of a corrected pulsed current value indicated by the signal Vcom of FIG. 6 and a bias current value determined by APC control on the scanning line. Thus, even in the case of the drum having the characteristic of FIG. 8, the value of laser driving current is reduced and the quantity of radiated light decreases on a part where a measured electric potential is lower than the target electric potential (the drum position on the scan start side of FIG. 8). For this reason, an unevenness of electric potential on the drum surface is corrected and brought close to the target electric potential. Similarly, the laser driving current is controlled on each sample point and interpolation point of main scan, so that a light quantity is actively controlled and an electric potential on each point of the drum surface comes close to the target electric potential.

Since two values of In+1 and In are necessary to calculate Inn+1, when an address corresponding to In is inputted to the memory 53, it is desirable to simultaneously output In and In+1 from the memory 53. The timing of Inn+1 is set between In and In+1, and thus the output of In+1 may be delayed as long as Inn+1 comes in time. Hence, for example, In and In+1 may be stored in a location corresponding to In in the memory and outputted at the same time. However, a memory capacity cannot be saved in this configuration. For this reason, the address may be inputted to the memory 53 earlier to read In+1 first.

Referring to FIG. 6, the operations of the pulsed current amount control unit 50 will be discussed anew according to the present embodiment. The signal FULL of lighting at full power and an enable signal are inputted from the sequence controller 47. The signal FULL of lighting at full power is outputted with a fixed zone before an image formation region (hereinafter, referred to as an effective scan region) of the photoconductor is scanned by a laser beam. The signal FULL is disabled after the laser beam is detected by the BD sensor and a BD signal is outputted. After a lapse of a fixed time since the output of the BD signal, the enable signal is inputted from the sequence controller 47. The enable signal inputted to the pulsed current amount control unit 50 is a signal for specifying timing for activating the counter 52. The clock S55 has a frequency half that of the clock S51.

When the enable signal rises, the counter 52 starts operating and address signals S52 are counted up one by one from 0 in synchronization with the clock S51. In the memory 53, digital values corresponding to I0 to I6 of the analog signal S56 are stored in addresses 0 to 6. The address signals S52 are inputted to the memory 53, and control data corresponding to the inputted addresses is sequentially outputted from I0.

The interpolation circuit 54 holds the first read control data I0 for one clock S51 (two clocks S55) and then outputs the data for one clock S55. The interpolation circuit 54 generates interpolation data I01 by using control data I1 outputted immediately after the data I0 from the memory, and outputs the data I01 for a time period of one clock S55. Similar operations are performed also when the address signal S52 has a value of 1 or larger. The interpolation circuit 54 holds the first read control data In for one clock S51 (two clocks S55) and then outputs the data for a time period of one clock S55. The interpolation circuit 54 generates interpolation control data Inn+1 by using control data In+1 outputted immediately after the control data In from the memory 53, and outputs the data In+1 for a time period of one clock S55.

The control data In having been read from the memory and the interpolated control data Inn+1 are converted to the analog signal S56 by the D/A converter 55. The analog signal S56 is smoothed by the low-pass filter 56 and controls, as the signal Vcom, the current value of the current source 42.

Figure 12:
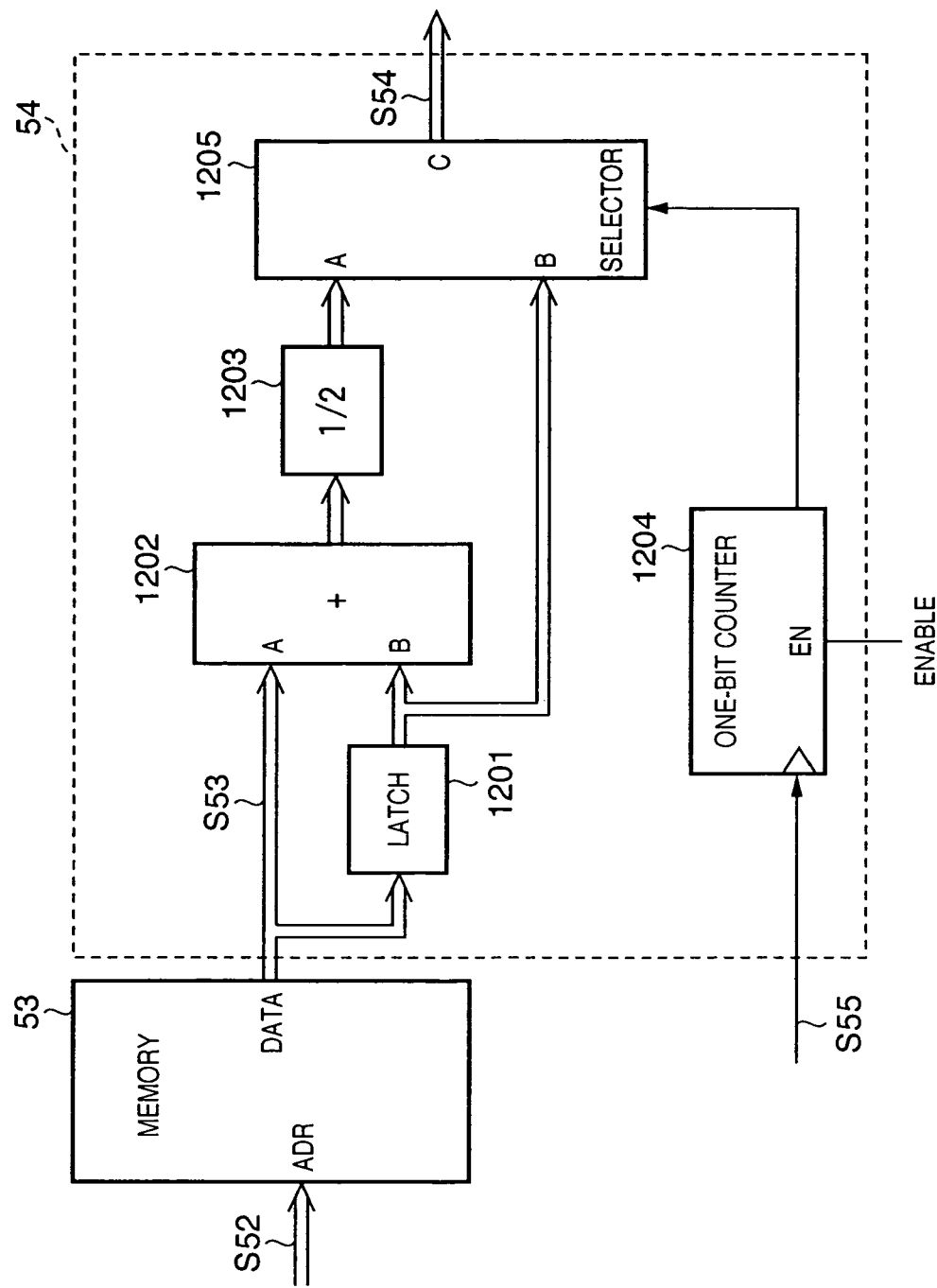
FIG. 12 is a diagram showing an example of the configuration of an interpolation circuit.

FIG. 12 shows an example of the configuration of the interpolation circuit 54. FIG. 12 shows merely an example and the interpolation circuit 54 can be implemented by various specific configurations. The control data outputted from the memory 53 is inputted to A input of an adder 1202 and inputted to B input of the adder 1202 through a latch 1201 synchronized with the clock S51. The output of the adder 1202 is inputted to A input of a selector 1205 through a half circuit 1203. The output of the latch 1201 is inputted to B input of the selector 1205. A select signal has a value obtained by counting the clock S55 in a one-bit counter 1204 and is a clock having a frequency half that of the clock S55.

Figure 13:
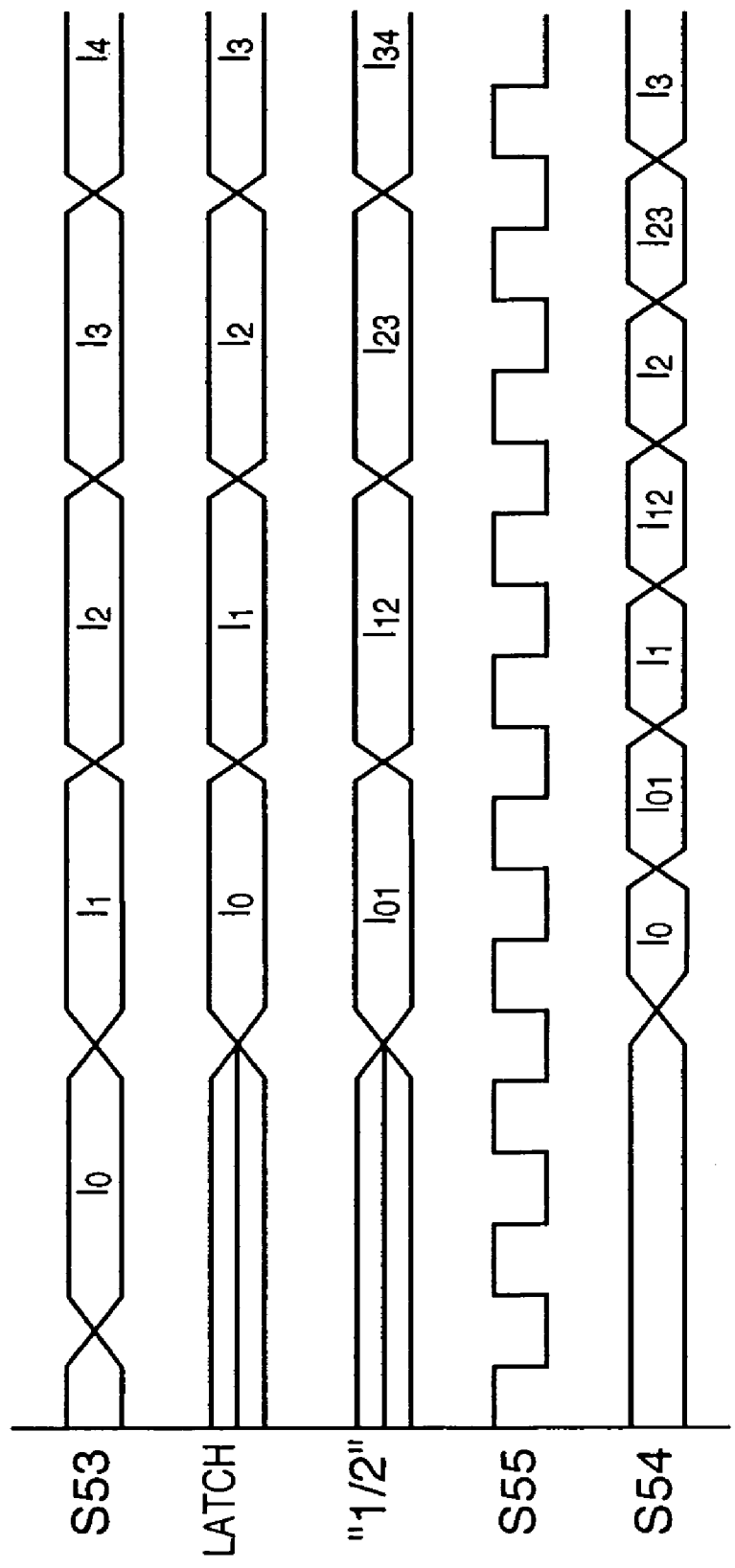
FIG. 13 is a diagram showing an example of the operation timing of the interpolation circuit.

As a result, as shown in FIG. 13, the value of the latch 1201 and the output value of the half circuit 1203 are switched in synchronization with the clock S55 and outputted as control data S54.

Figure 14:
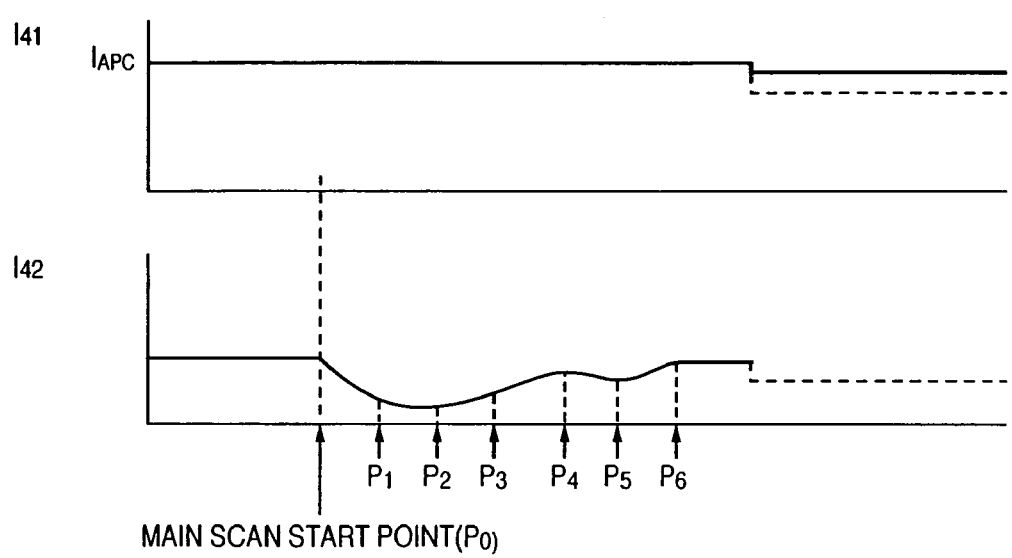
FIG. 14 is a diagram showing an example of controlled current.

FIG. 14 shows examples of a current value outputted from the current source 41 and a current value outputted from the current source 42 when the values of I0 to I6 shown in FIG. 6 are stored as control data in the memory 53. A constant current IAPC determined by the APC circuit 46 passes through the current source 41 for a time period of one scan. A different scanning line may have a different current. The current source 42 changes its output current value according to the value of Vcom. That is, a current according to Vcom passes through the current source 42. In FIG. 14, P0 to P6 indicate sampling points on a scanning line. As a result, a laser beam outputted from the laser 43 is controlled such that laser light decreases in a part having a low electric potential, thereby obtaining almost an even electric potential distribution on the scanning line. By turning on/off the laser light in this state in response to the image signal, it is possible to form a high-quality image without an unevenness of density caused by an unevenness of electric potential distribution of the photoconductor.

Second Embodiment

Figure 11:
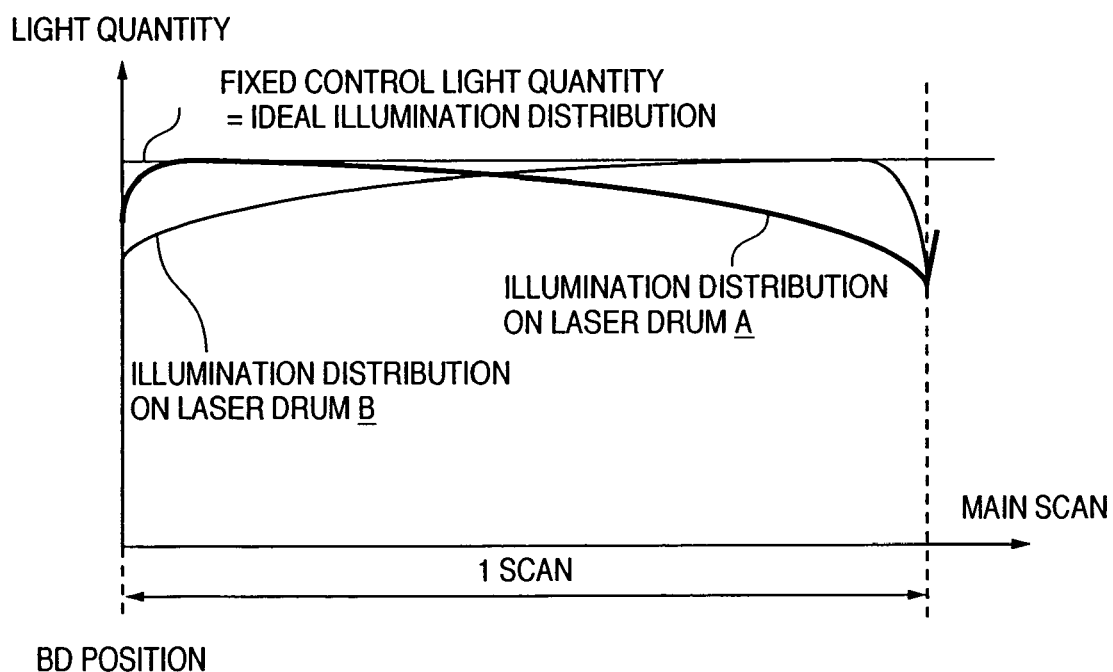
FIG. 11 is a diagram showing illumination distributions with a rapid change on the drum of the 2-beam laser.

Also when a 2-beam laser causes an uneven illumination distribution on a drum, the same configuration and operations as First Embodiment can smoothly correct the illumination distribution on the drum even in the even of a rapid change shown in FIG. 11. In this case, an illumination should be measured beforehand on a surface of a photoconductor instead of an electric potential. Therefore, an image forming apparatus comprises an illumination sensor instead of an electric potential sensor. Control data is stored in memory according to the measured illumination. As a matter of course, an illumination is measured and a pulsed current is controlled for each laser beam. As long as the control data is stored in the memory, control on each beam is similar to that of First Embodiment.

Third Embodiment

In First Embodiment, the clock S55 has a frequency twice that of the clock S51 and interpolation is performed only on one point between a sample point of main scan and an adjacent sample point. Interpolation may be performed on n−1 points by using a frequency of n times. For example, when interpolation is performed on three points between sample points n and n+1 of main scan (the data of the points are referred to as In and In+1) by using a frequency of four times, the following equations are preferably established:

$$I_i = (I_{n+1} - I_n)/4 + I_n$$

$$I_{i+1} = (I_{n+1} - I_n)/4 + I_i$$

$$I_{i+2} = (I_{n+1} - I_n)/4 + I_{i+1}$$

where Ii, Ii+1, and Ii+2 represent interpolation data in order of proximity to the sample point n. That is, a plurality of points are interpolated linearly between the adjacent sample points. Thus, it is possible to achieve control in fine steps, thereby correcting an illumination distribution mote smoothly. As a matter of course, it is possible to correct an electric potential distribution as well as an illumination distribution.

As described above, according to the present invention, even in the case of a photoconductor having an unevenness of electric potential characteristic with a rapid change in the main scanning direction or even in the case of a laser optical system having an illumination distribution characteristic with a rapid change, it is possible to more faithfully correct a surface electric potential and an illumination distribution, thereby providing a high-quality image.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code itself installed in the computer also implements the present invention. In other words, the claims of the present invention also cover a computer program for the purpose of implementing the functions of the present invention.

In this case, so long as the system or apparatus has the functions of the program, the program may be executed in any form, e.g., as object code, a program executed by an interpreter, or scrip data supplied to an operating system.

Examples of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

Further, it is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Furthermore, besides the case where the aforesaid functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-257425 filed on Sep. 3, 2004, which is hereby incorporated by reference herein.

What is claimed is:

1. A light source control apparatus for controlling a light source for forming an electrostatic latent image on an image carrying member in an electrophotographic image forming apparatus, the light source control apparatus, comprising:
a storing unit that stores first drive control data of the light source on two or more positions of the image carrying member,
an interpolating unit that generates second drive control data on at least one interpolation position between the two or more positions based on the first drive control data,
a digital-analog converting unit that converts the first and second drive control data to an analog signal,
a low-pass filter that cuts a high-frequency component of the analog signal outputted from the digital-analog converting unit, and
a driving unit that drives the light source in response to the analog signal from which the high-frequency component has been cut by the low-pass filter,
wherein the low-pass filter has a cut-off frequency higher than a frequency for sampling on the two or more adjacent positions on the image carrying member and lower than a frequency for sampling on the two or more positions and the interpolation position.

2. The light source control apparatus according to claim 1, wherein the storing unit stores control data for controlling a light quantity of the light source such that a constant electric potential is measured on each of the positions based on an electric potential measured on each of the positions when the image carrying member is scanned while a fixed current is applied to the light source.

3. The light source control apparatus according to claim 1, wherein the driving of the light source driven by the driving unit is turned on/off in response to a modulation signal based on image data.

4. An image forming apparatus, comprising:
a light source,
an image forming unit which develops a latent image to have a developed image, transfers the developed image to a printing medium, and fixes the image on the printing medium, the latent image having been formed on an image carrying member with light emitted from the light source,
a storing unit that stores first drive control data of the light source on two or more positions of the image carrying member,
an interpolating unit that generates second drive control data on at least one interpolation position between the two or more positions based on the first drive control data,
a digital-analog converting unit that converts the first and second drive control data to an analog signal,
a low-pass filter that cuts a high-frequency component of the analog signal outputted from the digital-analog converting unit, and
a driving unit that drives the light source in response to the analog signal from which the high-frequency component has been cut by the low-pass filter,
wherein the low-pass filter has a cut-off frequency higher than a frequency for sampling on the two or more adjacent positions on the image carrying member and lower than a frequency for sampling on the two or more positions and the interpolation position.

* * * * *